2,721,849

LINEAR CONDENSATION POLYMERS OF A POLYMETHYLENE GLYCOL AND A DIAMINODIPHENYL

Marion R. Lytton, West Chester, Pa., assignor to American Viscose Corporation, Philadelphia, Pa., a corporation of Delaware No Drawing. Application March 4, 1952,
Serial No. 274,825

19 Claims. (Cl. 260—2)

This invention relates to polymeric materials. More particularly it relates to synthetic linear condensation polymers and molded and extruded articles comprising them.

In accordance with the invention it has been found that a new class of extremely tough condensation polymers having film-forming and other valuable characteristics are obtained by heating a bifunctionally reactive alcohol with diaminodiphenyls unsubstituted in the positions para to the amino groups, or their alkyl, aryl or halogen nuclearly substituted derivatives.

The diaminodiphenyls which may be used as starting materials are 2,2'-diaminodiphenyl, 3,3'-diaminodiphenyl, and their nuclearly substituted derivatives having alkyl radicals containing from 1 to 3 carbon atoms, aryl radicals of the benzene series, or halogen atoms attached directly to one or both of the phenyl rings in any position other than para to the amino groups.

The dihydric alcohols which may be used are those glycols which do not tend to undergo intramolecular reaction with ring formation, i. e., polymethylene glycols in which the terminal hydroxyl groups are separated by a chain of at least six, preferably six to eighteen, methylene groups.

It is believed that when the diaminodiphenyl and glycol are heated, the hydroxyl groups of the glycol combine with a hydrogen atom on each of the amino groups whereby water is split out with the production of an intermediate heat-labile di-iminodiphenyl in which the imino groups are linked together by the alkane nucleus derived from the glycol. On continued heating, this intermediate rearranges, the amino groups being restored and the alkane nucleus shifting to link the two phenyl radicals of each unit of the polymer at their positions para to the amino groups.

The polymeric linear condensates may be designated as poly-(diaminodiphenylene-alkanes) and are built up from repeating structural units as shown in brackets in the formulae (a) and (b) below, the unit in (a) being repeated in the product obtained from 2,2'-diaminodiphenyl (or derivatives thereof) and the glycol, the unit in (b) being repeated in the product from 2,3'-diaminodiphenyl (or derivatives thereof) and the glycol:

where $x$ is an integer from 6 to 18 and $n$ is an integer greater than one and the several substituents $R_1$, $R_2$, $R_3$, $R_4$, $R_5$, and $R_6$ are each separately selected from the group consisting of hydrogen, halogen, alkyl radicals having 1 to 3 carbon atoms, and aryl radicals of the benzene series; the aforesaid substituents on each nucleus of the bracketed unit may be the same or different, and the substituents on one nucleus of the bracketed unit may be the same as or different from those on the other nucleus of the unit. These products are poly[(2,2'-diamino)diphenylene alkanes(5,5')] and poly[(3,3'-diamino)diphenylene alkanes(6,6')]. Thus, the polymeric condensation product of the 2,2'-diaminodiphenyl and hexamethylene glycol may be designated as poly[(2,2'-diamino)diphenylene(1,6-)hexane(5,5') and the condensate from the 2,2'-diaminodiphenyl and decamethylene glycol may be designated as poly[(2,2'-diamino)diphenylene (1,10-)-decane(5,5')]. The condensates may also be generically designated as poly-[bis-(p-aminophenyl)-alkanes] or poly-[alpha,omega-(di-p-aminophenyl) alkanes].

The repeating structural units of the polymeric condensates produced from 2,2'- or 3,3'-diaminodiphenyls having alkyl, aryl or halogen nuclear substituents are the same as in the formulae (a) and (b) except for the presence of such substituents on the phenyl rings. In the substituted products each phenyl ring of each unit of the polymeric condensate may carry from 1 to 3 nuclear substituents of the classes stated. The substituents on one phenyl ring of the unit may be the same as or different from substituents on the remaining ring of the unit. The presence of the substituents mentioned does not interfere with the condensation reaction or inhibit rearrangement of the intermediate di-iminodiphenyl alkane to the final polymeric product.

For highest yields the diaminodiphenyl and glycol are used in equimolecular proportions. The diaminodiphenyl may be partly replaced by its dihydrochloride or dihydrobromide. In the preferred embodiment, the diaminodiphenyl and glycol are used in equimolecular proportions and, in addition, the reaction mixture initially comprises the dihydrochloride or dihydrobromide of the diaminodiphenyl in an amount up to about one-half by weight of the diaminodiphenyl.

It is desirable to remove the by-product water as the heating proceeds in order to expedite the condensation and production of the poly-(diaminodiphenylene alkane). One means of accomplishing this objective is to conduct the reaction in the presence of a dehydrating agent such as zinc chloride or cobalt chloride. If this is done, the zinc chloride or cobalt chloride double compound formed can be decomposed after completion of the condensation by boiling the crude condensation mixture with an excess (e. g., 3 to 10 times the weight of the mixture) of aqueous alkali metal hydroxide as a concentrated (15–30%) solution.

The poly-(diaminodiphenylene alkanes) are somewhat tacky, unusually tough products which are fusible at tem-

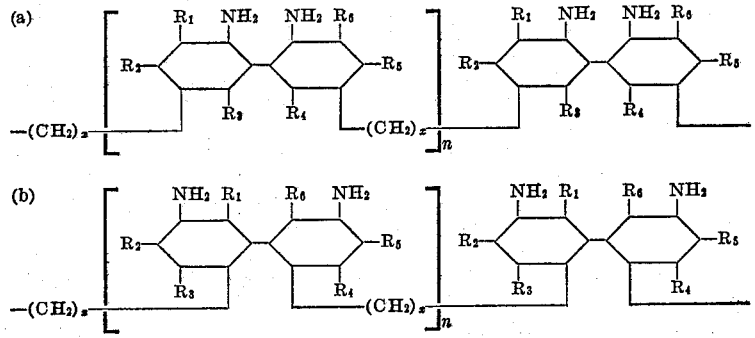

peratures between 50° C. and 55° C., and soluble in acetone and benzene.

Furthermore, N-acylation products of the polymers, such as poly-(N,N'-diacyl-diaminodiphenylene alkanes) may be obtained by heating the unacylated polymeric condensates with the anhydride of a lower fatty acid containing 2 to 4 carbon atoms. In general, the acylated polymers are characterized by higher fusing or melting temperatures than the parent polymeric condensates. Thus, the N,N'-diacetyl derivative of poly[(2,2'-diamino)diphenylene(1,10-)decane(5,5')] fuses between 65° C. and 70° C. while the N,N'-diacetyl derivative of poly[(2,2'-diamino)diphenylene(1,6-)hexane(5,5')] fuses between 75° C. and 80° C. The acetylated polymeric condensates also differ from the parent polymeric materials in being hard, brittle, and non-tacky. The N,N'-diacyl derivatives obtained by reacting the poly[(2,2'-diamino)diphenylene alkanes(5,5')] and poly[(3,3'-diamino)diphenylene alkanes(6,6')] with the lower fatty acid anhydride are made up, respectively, of repeating structural units shown in brackets in the formulae as follows:

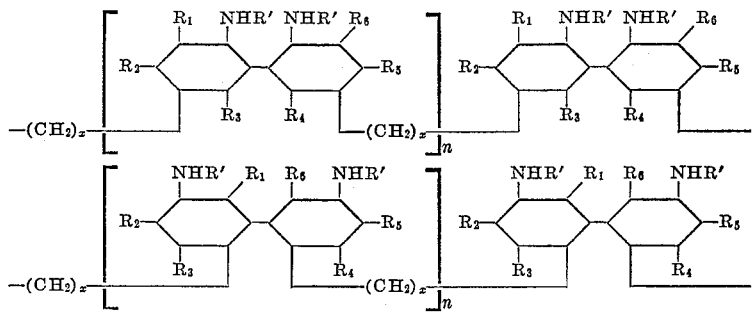

where $x$ is from 6 to 18, $n$ is greater than one, the substituents $R_1$, $R_2$, $R_3$, $R_4$, $R_5$, and $R_6$ are as defined hereinabove and $R'$ is the acyl radical having 2 to 4 carbon atoms.

The poly-(diaminodiphenylene alkanes) and their acetyl derivatives can be formed into synthetic fibers for use in applications where comparatively low softening and melting temperatures are not a disadvantage, for example in the production of felt-like fibrous articles comprising autogenously bonded fibers. The polymers may also be used in the production of films, coatings, sealants, adhesives, for laminating similar and dissimilar surfaces, and for the production of molded massive articles of diverse size and cross-section, either alone or in admixture with other plastic, moldable materials and/or molding adjuvants. They can be melt-extruded as such or in mixtures with plasticizing and/or other extrudable plastics to form films, tapes, tubes, ribbons, rods or other shaped articles. Thus, they may be heated to their fusing temperature to obtain a hot melt which can be extruded under pressure to deposit a film on a surface from which it can be stripped off or on a suitable substrate to which it can be adhered with the aid of pressure. For instance, the polymeric condensates may be melted in a heated cylinder or the like and pumped through a film-forming extrusion die, or they may be fed into a conventional screw mixer-extruder and extruded as a cylindrical rod which is broken into small pieces and then fed into a screw extruder in which it is melted and forced through an extrusion die.

Also, the poly-(diaminodiphenylene alkanes) and the acylated products thereof may be dissolved in a suitable solvent such as acetone or benzene and cast to films which may be self-supporting or adhered to a substrate such as a regenerated cellulose film. Or the solutions may be used in coating paper, textiles, and other materials.

The poly-(diaminodiphenylene alkanes) and the corresponding acetylated polymers may be molded by compression or injection molding techniques and for this purpose they may be mixed with other thermoplastic resins, fillers, plasticizers, mold lubricants, special effect materials, etc.

Fillers which may be present in molding compositions comprising the polymers include alpha-cellulose, wood flour, walnut shell flour, asbestos in the form of a powder or long or short fibers, finely divided silicon carbide, carbon black, diatomaceous earth, slate dust, powdered rutile, powdered or flake mica, powdered quartz, fibers and cloth cuttings (e. g., fibers or cloth cuttings of silk, rayon, wool, linen, cotton, nylon, glass or polymeric or copolymeric acrylonitrile), ground cork, sand, etc.

Useful plasticizing agents include dialkyl phthalates such as dibutyl and dioctyl phthalates.

As mold lubricants there may be used zinc stearate, calcium stearate, mixtures thereof, or natural or synthetic waxes.

These molding adjuvants and other plastic materials, if such are used, may be mixed with the finely divided poly-(diaminodiphenylene alkanes) in a Banbury mixer or on conventional milling rolls, and the compositions may be molded with or without preliminary shaping thereof to convenient pellet form.

Examples of the nuclearly substituted 2,2'- and 3,3'-diaminodiphenyls which may be condensed with the glycol or a mixture of the glycols include:

2,2'-diamino-3,3'-dimethyldiphenyl
2,2'-diamino-6,6'-diethyldiphenyl
2,2'-diamino-4,4'-dichlorodiphenyl
2,2'-diamino-3,3'-diphenyldiphenyl
3,3'-diamino-2,2'-dipropyldiphenyl
3,3'-diamino-5,5'-dibromodiphenyl
3,3'-diamino-2,2'-diphenyldiphenyl The following examples in which the parts given are by weight unless otherwise specified are illustrative of the invention.

*Example 1*

52.2 parts of decamethylene glycol, 55.2 parts of 2,2'-diaminodiphenyl, 25.8 parts of the dihydrochloride of 2,2'-diaminodiphenyl and 49.2 parts of zinc chloride were mechanically mixed in a reaction vessel and heated to 165° over a period of six hours. The mixture was then heated at 165° C. for 15 hours and finally at between 240° C. and 255° C. for eight hours, the mass being intermittently homogenized by stirring during the first part of the heating. The mass was allowed to cool, and then boiled three successive times with 250 parts of an aqueous 18% sodium hydroxide solution. Between each boiling, the zinc salts were decanted off. On final boiling no further zinc salts appeared.

The polymer was washed free of caustic and steam-distilled to remove low molecular weight fractions and other impurities. The non-volatile polymer was dried in a vacuum over concentrated $H_2SO_4$. The poly[(2,2'-diamino)diphenylene(1,10-)decane(5,5')] thus obtained was a very tough, somewhat tacky product which could be cut with a sharp knife and melted at 50 to 55° C. It was soluble in acetone and benzene.

About 5.4 parts of the polymer were dissolved in about 100% of its weight of acetic anhydride, and the solution was warmed on a steam bath for two hours. It was cooled, filtered, and the excess acetic anhydride in the filtrate was decomposed by boiling in distilled water. The acetylated polymer was precipitated, washed, and dried. It was hard, brittle and non-tacky, soluble in benzene, acetone, glacial acetic acid, ethanol and ether, insoluble in water and methanol, and melted at 65 to 70° C.

Example II

A portion of the acetylated polymeric condensate of Example I was dissolved in benzene to obtain a 15% solution which was cast onto a heated surface to form a pliable, tough film which could be readily stripped off the casting surface without tearing or crumbling.

Example III

About 35.4 parts of hexamethylene glycol, 55.2 parts of 2,2'-diaminodiphenyl, 25.8 parts of the dihydrochloride of 2,2'-diaminophenyl, and 49.2 parts of zinc chloride were well mixed in a vessel and heated to 160° C. over a period of eight hours. The mixture was then heated for two hours at 200° C., and finally for 15 hours at between 230° C. and 250° C. During the initial heating period, the reaction mixture was homogenized intermittently by stirring. The mass was cooled and the zinc salts were decomposed and removed as in Example I, after which the residue was washed and steam-distilled. Yield: 72 parts of poly[(2,2'-diamino)diphenylene(1,6-)hexane-(5,5')]. The dried polymer was slightly tacky and extremely tough and difficult to cut or break. It was soluble in acetone and benzene, and melted between 50° C. and 55° C.

Example IV

About 10 parts of the polymer of Example III were dissolved in 81.2 parts of acetic anhydride. The solution was cooled, poured into water, boiled, and again cooled. The solid acetylated polymer was filtered off, washed and dried. Yield, 8.0 parts. It was a hard solid having a melting point between 75° C. and 80° C. The acetylated polymer was soluble in acetone, glacial acetic acid, ethanol and ether, insoluble in water and methanol.

Benzene and acetone solutions of the acetylated polymeric condensate were cast to tough flexible films.

The decamethylene and hexamethylene glycols used in Examples I and III could be replaced by other glycols containing up to eighteen methylene groups in a chain separating the terminal hydroxyl groups, and the diaminodiphenyls could be replaced by the nuclearly substituted derivatives previously mentioned. Lower temperatures than those stated in the examples might be used but require longer heating times and therefore it is preferred to heat the mixed reactants to about 160° C. to 165° C. until the condensation is initiated, and then elevate the temperature to between 200 and 250° C. until polymerization is complete.

As various other changes and modifications may be made in practicing the invention without departing from its spirit and scope, it is to be understood that the invention is not limited to the specific embodiments thereof except as defined in the appended claims.

I claim:

1. A linear polymeric substance selected from the group consisting of (a) compounds having the general formula

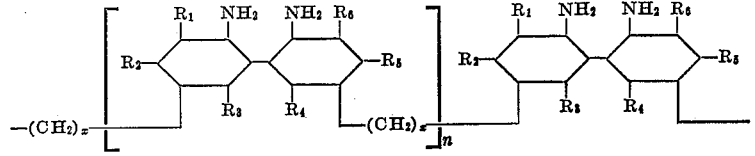

(b) compounds having the general formula

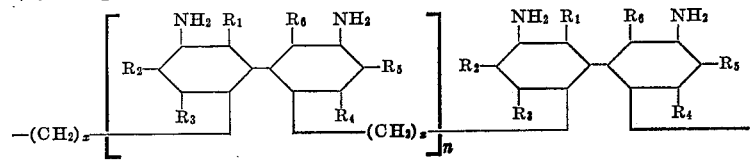

and N-acylation products of the compounds of (a) and (b) in which each acyl group has from 2 to 4 carbon atoms; in each of formulae (a) and (b), $x$ being an integer from 6 to 18, $n$ being an integer greater than one, and the several substituents $R_1$, $R_2$, $R_3$, $R_4$, $R_5$, and $R_6$ each having separately selected from the class consisting of hydrogen, halogen, alkyl radicals having 1 to 3 carbon atoms, and aryl radicals of the benzene series.

2. A composition of matter comprising a polymeric substance defined in claim 1 dissolved in a solvent therefor.

3. A poly[(2,2'-diamino)diphenylene(1,6-)hexane(5,5')].

4. A composition of matter comprising a polymeric substance defined in claim 3 dissolved in a solvent therefor.

5. A poly[(2,2'-diamino)diphenylene(1,10-)decane(5,5')].

6. A composition of matter comprising a polymeric substance defined in claim 5 dissolved in a solvent therefor.

7. An N-acylation product of a polymeric substance defined in claim 6, the acyl groups having 2 to 4 carbon atoms.

8. A composition of matter comprising a product defined in claim 7 dissolved in a solvent therefor.

9. The N,N'-diacetyl derivative of poly[(2,2'-diamino)diphenylene(1,10-)decane(5,5')].

10. A composition of matter comprising a product defined in claim 9 dissolved in a solvent therefor.

11. The N,N'-diacetyl derivative of poly[(2,2'-diamino)diphenylene(1,6-)hexane(5,5')].

12. A composition of matter comprising a product defined in claim 11 dissolved in a solvent therefor.

13. The process for the production of poly-(diaminodiphenylene alkanes) which comprises heating a mixture comprising a polymethylene glycol having from 6 to 18 carbon atoms and a substance selected from the group consisting of 2,2'-diaminodiphenyl and 3,3'-diaminodiphenyl, and derivatives of said diaminodiphenyls having nuclear substituents selected from the group consisting of alkyl radicals containing from 1 to 3 carbon atoms, aryl radicals of the benzene series, and halogen atoms attached directly to the phenyl rings at any position except the positions para to the amino groups, until a poly-(diaminodiphenylene alkane) is produced having the structure of the compounds (a) and (b) of claim 1 herein.

14. The process as in claim 13, in which the mixture heated also comprises a dihydrohalide selected from the group consisting of the dihydrochloride and dihydrobromide of the diaminodiphenyl.

15. The process for the production of a poly-(diaminodiphenylene alkane) which comprises heating a mixture of a polymethylene glycol containing 6 to 18 carbon atoms, a metal halide selected from the group consisting of zinc chloride and cobalt chloride, and a substance selected from the group consisting of 2,2'-diaminodiphenyl, 3,3'-diaminodiphenyl and derivatives of said diaminodiphenyls having nuclear substituents selected from the group consisting of alkyl radicals containing from 1 to 3 carbon atoms, aryl radicals of the benzene series, and halogen atoms attached directly to the phenyl rings at any position except the positions para to the amino groups, until the poly(diaminodiphenylene alkane) is produced having the structure of the compounds (a) and (b) of claim 1 herein, treating the crude reaction product with aqueous alkali metal hydroxide, and separating the poly(diaminodiphenylene alkane).

16. The process of claim 15, in which the mixture heated comprises 2,2'-diaminodiphenyl and hexamethylene glycol.

17. The process of claim 15, in which the mixture heated comprises 2,2'-diaminodiphenyl and decamethylene glycol.

18. The process of claim 15, in which the mixture heated comprises 2,2'-diaminodiphenyl, hexamethylene glycol, zinc chloride and 2,2'-diaminodiphenyl dihydrochloride.

19. The process of claim 15, in which the mixture heated comprises 2,2'-diaminodiphenyl, decamethylene glycol, zinc chloride and 2,2'-diaminodiphenyl dihydrochloride.

No references cited.